United States Patent [19]

Sluyterman

[11] Patent Number: 4,755,714

[45] Date of Patent: Jul. 5, 1988

[54] ELECTROMAGNETIC DEFLECTION UNIT FOR A TELEVISION PICTURE DISPLAY TUBE

[75] Inventor: Albertus A. S. Sluyterman, Eindhoven, Netherlands

[73] Assignee: U.S. Philips Corp., New York, N.Y.

[21] Appl. No.: 6,041

[22] Filed: Jan. 21, 1987

[30] Foreign Application Priority Data

Feb. 13, 1986 [NL] Netherlands ........................ 8600355

[51] Int. Cl.[4] ........................ H01J 29/76; H04N 9/28

[52] U.S. Cl. ........................ 313/440; 335/213

[58] Field of Search ................ 313/440; 335/213, 211, 335/214

[56] References Cited

U.S. PATENT DOCUMENTS 3,020,434 2/1962 Bloomsburgh ........................ 313/440

4,260,974 4/1981 Nelle ........................ 335/213

FOREIGN PATENT DOCUMENTS 2307018 11/1976 France .

3352 1/1982 Japan ........................ 335/213

2179493A 3/1987 United Kingdom .

744781 7/1980 U.S.S.R. ........................ 313/440

*Primary Examiner*—David K. Moore

*Assistant Examiner*—K. Wieder

*Attorney, Agent, or Firm*—Thomas A. Briody; Jack Oisher

[57] ABSTRACT

An electromagnetic deflection unit for a television picture display tube, the deflection unit being arranged around the envelope of the display tube and comprising a first deflection coil and a second deflection coil located more closely to the display tube envelope than the first deflection coil and coaxially therewith. An annular core of magnetizable material encloses groups of conductors of both the first and second deflection coils. An additional annular core of magnetizable material encloses groups of conductors of only the second deflection coil, being placed around the portion of such coil which extends beyond the end of the first deflection coil in the direction toward the display screen of the display tube. The mutual locations of the dipole fields produced by the deflection coils thereby reduce north-south raster error.

2 Claims, 1 Drawing Sheet

ELECTROMAGNETIC DEFLECTION UNIT FOR A TELEVISION PICTURE DISPLAY TUBE

BACKGROUND OF THE INVENTION

1. Field of the Invention

The invention relates to an electromagnetic deflection unit for a television picture tube whose neck accommodates an electron gun system for directing at least one electron beam to a display screen, the electromagnetic deflection unit being arranged around the envelope of the display tube and comprising a first deflection coil and a second deflection coil which is located more closely to the envelope of the display tube and coaxially with respect to the first deflection coil, each coil having a front end facing the display screen and a rear end, the second deflection coil being of the saddle type.

2. Description of the Prior Art

In monochrome display tubes the electron gun system is adapted to produce one electron beam. in colour display tubes the electron gun system is adapted to produce three electron beams.

In monochrome display tubes for, for example, data display uses and for TV projection tubes, the aim is to use a deflection unit having deflection coils which yield such a field distribution that the spot quality in all areas of the display screen, also in the corners, is as perfect as possible.

For some time colour display tubes have been used in which three spatially separated electron guns are located in one line. A display tube of this type is known as an in-line colour display tube. In the in-line colour display tube the aim is to use a deflection unit having deflection coils yielding such an inhomogeneous field distribution that the beams of the electron guns coincide across the entire screen when they are deflected. To this end particularly the horizontal deflection field (to be generated by the second deflection coil) should be barrel shaped toward the gun side of the deflection yoke and should be pincushion-shaped towards the sreen side thereof, and conversely the vertical deflection field (to be generated by the first deflection coil) should be pincushion-shaped toward the gun side of the deflection yoke and barrel shaped towards the screen side thereof.

The extent of the pincushion and barrel shaping is such that during deflection the convergence errors of the electron beams emitted by the electron guns are corrected so that pictures having satisfactory convergence properties can be produced on the screen of the display tube. Display tube—deflection yoke combinations of this type are referred to as self convergent.

If the spot quality (in minochrome tubes) or the convergence (in colour tubes) is ensured in the manner described above (in practice the deflection coils must often be combined with auxiliary means for enhancing the pincushion and/or barrel shape of the deflection fields, which auxiliary means may be, for example, plates of a soft magnetic metallic material placed in the deflection fields) it is still often found that a disturbing (pincushion-shaped) raster distortion (north-south, and east-west raster distortion) occurs on the edges of the display screen, which distortions must be corrected.

Until recently such raster distortion correction had been sought by using permanent magnets (referred to as raster magnets) or by providing a wire distribution in the line and/or the field deflection coil such that a strong 6-pole magnetic field component is produced upon energizing. However, now that the display screen has become increasingly flatter in the latest types of display tubes, the known correction methods fall short.

SUMMARY OF THE INVENTION

The invention provides a new way of achieving such correction, which obviates both the production of strong 6-pole components and the use of raster magnets.

To this end a device of the type described in the opening paragraph according to the invention is characterized in that the front end of the second (line) deflection coil is located more closely to the display screen than the front end of the first (field) deflection coil. The first annular core of a magnetisable material, which encloses groups of conductors of only the second deflection coil, is placed between the front ends of the first and the second deflection coils. A second annular core of a magnetisable material, which encloses groups of conductors of both the first and the second deflection coils is positioned more closely to the electron gun system than the first annular core.

The invention is based on the recognition that the location of the dipole magnetic fields produced by the first and the second deflection coils relative to each other is decisive of the proportion ratio between north-south and east-west raster distortion. According to the invention, by causing the dipole field of the second deflection coil (generally this is the horizontal dipole field) to extend closer to the display screen than the dipole field of the first deflection coil (generally this is the vertical dipole field), the north-south raster distortion may be reduced relative to the east-west raster distortion. This, however, is only effective enough when an annular core of a magnetisable material is provided around the part of the second deflection coil which extends between the front end of the first deflection coil and the display screen. On the one hand this annular core, which thus encloses only groups of conductors of the second deflection coil, intensifies the field of the second deflection coil. This intensifying action is additionally effective because the annular core is arranged directly around the groups of conductors of the second deflection unit without groups of conductors of the first deflection unit being positioned between them. On the other hand this annular core weakens the part of the field of the first deflection coil extending between the front end thereof and the display screen. This weakening action is particularly important when the first deflection coil is of the toroidally would type, because the part of the field of a toroidally wound deflection coil extending beyond the front (and rear) end thereof is stronger than the part of the field of a deflection coil of the saddle type extending beyond the front (and rear) end thereof.

The invention also relates to a deflection unit for use in a device as described above.

BRIEF DESCRIPTION OF THE DRAWINGS

An embodiment of the invention will be described in greater detail with reference to the drawing, wherein:

FIG. 1 shows a television display device having a colour display tube 1 of the three-in-line electron gun type having a neck portion 2 accommodating an electron gun system 3 for producing three co-planar electron beams and having a display screen 4 on which repetitive groups of red, blue and green phosphor elements are provided in front of a colour selection electrode. The invention is, however, not limited to a television display device having a colour display tube. The display tube 1 may be alternatively a monochrome display tube with a suitable electron gun system 3 and with a display screen comprising one type of phosphor elements.

Figure 1:
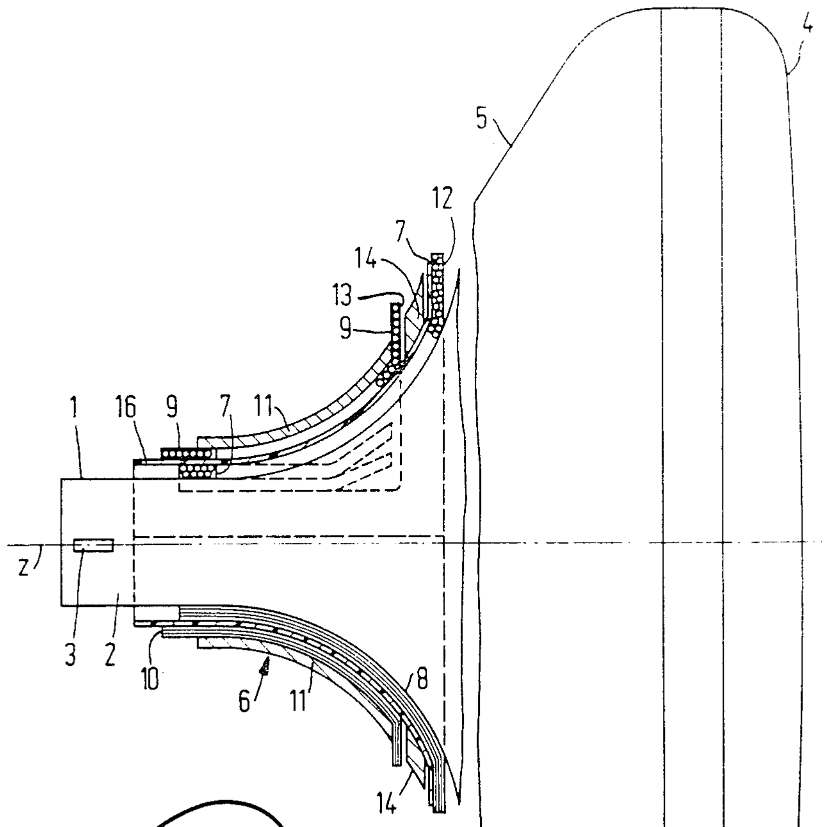
FIG. 1 is a diagrammatical plan view of a cross-section through a television display tube on which a deflection unit is mounted.

A deflection unit 6 is arranged around the envelope 5 of the display tube 1. It comprises a line deflection coil constituted by two line deflection coil units 7, 8 and a field deflection coil constituted by two field deflection coil units 9, 10. An annular core 11 of a soft magnetic material is placed coaxially around the line deflection coil and the field deflection coil both of which are shown as saddle type coils in the Figure. Saddle type coils are understood to mean coils constituted by two groups of longitudinally extending conductors facing each other whose ends are connected together by arched groups of conductors placed transversely to the longitudinal direction.

Figure 2A:
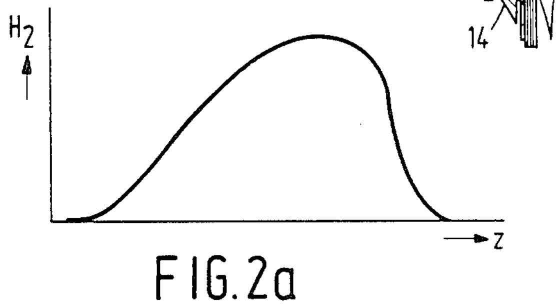
FIG. 2A shows the dipole field generated by the second (line) deflection coil of the deflection unit of FIG. 1.
Figure 2B:
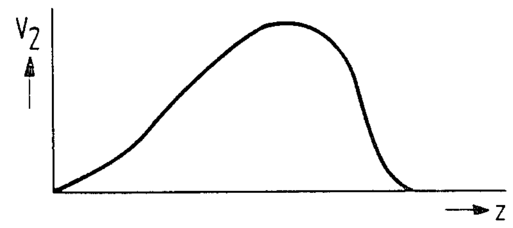
FIG. 2B shows the dipole first (field) generated by the field deflection coil of the deflection unit of FIG. 1.

The front end 12 of the line deflection coil with the coil units 7, 8 is located more closely to the display screen 4 than the front end 13 of the field deflection coil with the coil units 9, 10. An annular core 14 of a magnetisable material which encloses groups of conductors of only the coil units 7, 8 of the line deflection coil is placed between the front ends 12 and 13. In the embodiment shown the annular core 4 is placed on the outside of a hollow synthetic material support 16 with the line deflecton coil units 7, 8 being mounted against the inside of this support. The line deflection coil extends closer to the display screen than the field deflection coil. This means that the horizontal dipole field will extend closer to the display screen 4 than the vertical dipole field when the respective deflection coils are energized. This situation is shown in FIG. 2A and FIG. 2B. The intensity $H_2$ of the horizontal dipole field which is generated by the deflection unit 6 along the Z axis is shown in FIG. 2A and the intensity $V_2$ of the vertical dipole field which is generated by the deflection unit 6 along the Z axis is shown in FIG. 2B. With such a mutual location of the dipole fields the north-south raster error may be reduced quite considerably with respect to the east-west raster error. The latter may be corrected with the aid of an electric circuit.

The invention can be used to advantage particularly in television display devises having a display tube with a screen which is flatter than was previously conventional (referred to as FS type display tube).

What is claimed is:

1. An improved electromagnetic deflection unit for arrangement around the envelope of the display tube of a device for displaying television pictures, such device having a gun system in the neck of the display tube for directing at least one electron beam to a display screen of the display tube, such electromagnetic deflection unit comprising a first deflection coil and a second deflection coil which is located more closely to the envelope of the display tube and coaxially with respect to the first deflection coil, each coil having a front end facing the display screen and a rear end, the second deflection coil being of the saddle type; such improvement being characterized in that the front end of the second deflection coil is located more closely to the display screen than the front end of the first deflection coil, a first annular core of a magnetisable material which only encloses groups of conductors of the second deflection coil is placed between the front ends of the first and the second deflection coils, and a second annular core of a magnetisable material which encloses groups of conductors of both the first and the second deflection coils is placed more closely to the gun system than the first annular core.

2. An electromagnetic deflection unit as claimed in claim 1, characterized in that the first deflection coil is toroidally wound on the second annular core.

* * * * *